Nov. 18, 1941.
R. PUDELKO
2,263,517
ELECTRICAL MEASURING APPARATUS
Filed Aug. 23, 1938
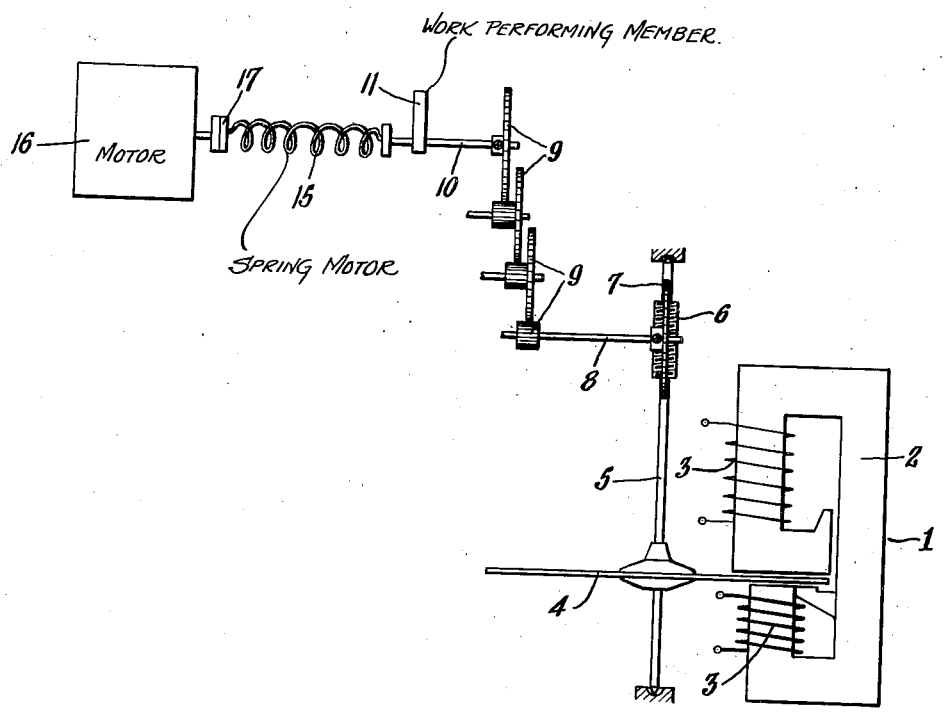
INVENTOR
BY R. Pudelko
Morgan Finnegan & Durham
ATTORNEYS Patented Nov. 18, 1941

2,263,517

UNITED STATES PATENT OFFICE 2,263,517

ELECTRICAL MEASURING APPARATUS

Richard Pudelko, Zug, Switzerland, assignor to Landis & Gyr, A.-G., Zug, Switzerland, a body corporate of Switzerland Application August 23, 1938, Serial No. 226,239
In Switzerland October 22, 1937

1 Claim. (Cl. 171—34)

The invention relates to a new and useful improvement in electrical measuring apparatus, and more especially to such improvement incorporated in the control means for the supply and registration of energy from a power circuit to a user, where such control means is driven or controlled by an electricity meter.

In mechanism of the kind described it is frequently required that mechanical work to a material degree must be performed in controlling the power supply, in the fixing and the registering or recording of differential tariffs for various periods and energy quantities and the like, such work to be done and changes to be effected in accordance with the metering of the supplied energy. Such mechanisms usually comprise a transmission train from the meter to a driven or work-performing member, which is also a speed reduction train, and which offers appreciable frictional resistance and torque transmitting stress, in addition to the energy required to enable a driven member to perform a required work or function. The present invention provides an additional driving force for effecting the mechanical work to be done, acting on the driven member, i. e., the work-performing member, in the same direction as the normal driving member, i. e. the electricity meter, so as to leave a driving train between the meter and work-performing member partly or preferably wholly free from frictional resistance, from transmitting torque or other mechanical strain, and in some instances adding more energy to effect work or other function than can be received from the meter.

The accompanying drawing represents diagrammatically a portion of a meter-driven, circuit-controlling mechanism capacitated to change or control the supply of current, or the conditions of supply, or the computation and registration of energy consumption, and the imposition of differential tariffs, and the like, in accordance with the metering of the current by the meter.

In said diagrammatic view an electricity meter 1 is shown, having a core 2 and coils 3 which may be of any known or suitable form. The meter disc 4 is mounted on a spindle 5 on which is a worm 6. Meshing with worm 6 is a worm wheel 7, fixed on a shaft 8. From shaft 8 extends a train 9 of transmitting and reduction gearing, terminating in a gear on a shaft 10. Fixed to, or mechanically connected to shaft 10 is a work-performing member 11, which may be of various practical forms, depending on the nature of the work to be done in or on the circuit-controlling, power-supplying means and registering means. This member as shown is a lifting or actuating cam for actuating a tariff change device (not shown) and which may be of known or other suitable form.

The additional mechanical force applied to cooperate with the meter drive to perform the mechanical work and relieve the meter driven train of frictional resistance, torque strain and other mechanical strains, is shown diagrammatically as a spring motor 15, acting directly on the shaft 10 and tending to drive it continuously in the same direction as the drive from the meter. Thus the driven train is relieved from frictional resistance, torque strain, and other strains, the meter is also relieved, if desired, of the mechanical work and its increased energy consumption requirements, and the meter is left with only the duty of regulating the driven member, i. e. the work-performing member, in accordance with the energy consumption. The driving force of the power device 15 can consequently neutralize the frictional resistance in the gear train 9, so that the driving moment of the meter is relieved from such resistance and the driving power of the meter disc can be fully utilized. In any case, as above indicated, where the work to be done requires more power than is available from the turning moment of the meter disc, or corresponding member of an electrical measuring apparatus, the additional driving force applied is made sufficient to counterbalance this necessary work plus the frictional resistance of the transmission gearing, so that the meter, or the like, serves only as a controlling means.

The worm gearing 6 and 7 forms an irreversible drive from the meter disc 4 to the load or work performing member 11 so that the torque of motors 15 and 16 cannot drive the meter.

Means are provided for maintaining the energy supply of the motor 15, and for this purpose there is diagrammatically shown a motor 16 applying rotational or torque producing energy to the spring motor 15 by means of a friction, or other slip clutch 17. The motor 16 may be continuously, intermittently or regulably driven by any suitable means as desired. Thus a predetermined degree of energy may be maintained in the motor 15 available for the purposes described and the slip clutch operates also as a protection from overwinding of the motor 15.

The invention in its broader aspects is not limited to the specific mechanisms shown and described but departures may be made there-from within the scope of the accompanying claim without departing from the principles of the invention and without sacrificing its chief advantages.

What I claim is:

In a mechanism for controlling and registering the supply of electrical energy from a power circuit and in combination, a driven member operable to affect said controlling and registering, a meter for metering the energy consumption, a train comprising irreversible gears and shafts directly coupling the meter to the driven member for maintaining the speed of said driven member in proportion to the speed of the meter, a spring motor directly connected to drive said driven member in the same direction as the meter, a motor for supplying energy to said spring motor and a slip drive between the last-mentioned motor and the spring motor.

RICHARD PUDELKO.